US008269769B1

(12) United States Patent
Voorhies et al.

(10) Patent No.: US 8,269,769 B1
(45) Date of Patent: Sep. 18, 2012

(54) OCCLUSION PREDICTION COMPRESSION SYSTEM AND METHOD

(75) Inventors: Douglas A. Voorhies, Menlo Park, CA (US); Svetoslav D. Tzvetkov, Irvine, CA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 10/745,277

(22) Filed: Dec. 22, 2003

(51) Int. Cl.
*G06T 15/40* (2006.01)
(52) U.S. Cl. ........................................... 345/422
(58) Field of Classification Search .................. 345/421, 345/953, 422
See application file for complete search history.

(56) References Cited

U.S. PATENT DOCUMENTS

| | | | |
|---|---|---|---|
| 4,958,305 A | | 9/1990 | Piazza |
| 5,043,921 A | * | 8/1991 | Gonzalez-Lopez et al. .. 345/422 |
| 5,369,741 A | | 11/1994 | Hartog et al. |
| 5,583,974 A | | 12/1996 | Winner et al. |
| 5,596,686 A | | 1/1997 | Duluk, Jr. |
| 5,694,143 A | * | 12/1997 | Fielder et al. ................. 345/519 |
| 5,751,291 A | | 5/1998 | Olsen et al. |
| 5,761,400 A | | 6/1998 | Derby et al. |
| 5,909,595 A | * | 6/1999 | Rosenthal et al. ............... 710/38 |
| 5,914,721 A | | 6/1999 | Lim |
| 5,990,904 A | | 11/1999 | Griffin |
| 6,046,746 A | | 4/2000 | Deering |
| 6,052,128 A | | 4/2000 | Narayanaswami et al. |
| 6,052,129 A | | 4/2000 | Fowler et al. |
| 6,091,428 A | * | 7/2000 | Piazza et al. .................. 345/545 |
| 6,094,200 A | | 7/2000 | Olsen et al. |
| 6,172,670 B1 | * | 1/2001 | Oka et al. ....................... 711/200 |
| 6,246,415 B1 | * | 6/2001 | Grossman et al. ............. 345/422 |
| 6,323,860 B1 | * | 11/2001 | Zhu et al. ....................... 345/427 |
| 6,373,485 B2 | | 4/2002 | Sowizral et al. |
| 6,407,741 B1 | * | 6/2002 | Morein et al. ................. 345/555 |
| 6,445,390 B1 | | 9/2002 | Aftosmis et al. |
| 6,476,807 B1 | | 11/2002 | Duluk, Jr. et al. |
| 6,480,205 B1 | * | 11/2002 | Greene et al. ................. 345/631 |
| 6,525,726 B1 | | 2/2003 | Xie et al. |
| 6,630,933 B1 | | 10/2003 | Van Hook |
| 6,636,212 B1 | | 10/2003 | Zhu |
| 6,636,215 B1 | | 10/2003 | Greene |
| 6,646,639 B1 | | 11/2003 | Greene et al. |

(Continued)

OTHER PUBLICATIONS

M. Meiβner, D. Bartz, and R. Günther and W. Straβer, "Visibility Driven Rasterization," 2001, Computer Graphics Forum, vol. 20 No. 4, p. 283-294.*

(Continued)

*Primary Examiner* — Kee M Tung
*Assistant Examiner* — Zhengxi Liu

(57) ABSTRACT

An occlusion prediction compressing system and method are presented in accordance with embodiments of the present invention. In one embodiment, an occlusion prediction graphics processing method is utilized to predict which pixels are eventually occluded before intermediate processing stages are performed on the pixels. Culling information utilized to predict which pixel are occluded is compressed in accordance with embodiments of the present invention. In one embodiment, a cull value for a pixel culling area is retrieved and an end of pipe depth value associated with a prediction area within the pixel culling area is received. A determination is made if the end of pipe depth value is within a threshold range of the cull value. The cull value is updated based upon the relationship of the end of pipe depth value to offsets from the cull value. The cull value is associated with a mask which indicates if a plurality of prediction areas are at or in front of the cull value.

20 Claims, 6 Drawing Sheets

U.S. PATENT DOCUMENTS

| | | | |
|---|---|---|---|
| 6,677,945 B2 | 1/2004 | Lapidous et al. | |
| 6,717,576 B1 | 4/2004 | Duluk, Jr. et al. | |
| 6,720,964 B1 * | 4/2004 | Fowler et al. | 345/422 |
| 6,862,025 B2 * | 3/2005 | Buehler | 345/424 |
| 6,900,800 B2 | 5/2005 | Baldwin | |
| 6,924,801 B1 | 8/2005 | Dorbie | |
| 7,030,877 B1 | 8/2006 | Sell | |
| 7,091,971 B2 * | 8/2006 | Morein | 345/422 |
| 7,218,317 B2 * | 5/2007 | Liao et al. | 345/418 |
| 7,242,400 B2 * | 7/2007 | Van Hook et al. | 345/418 |

OTHER PUBLICATIONS

U.S. Appl. No. 10/745,160, filed Dec. 22, 2003; Douglas A. Voorhies; Occlusion Prediction Compression System and Method.

U.S. Appl. No. 11/303,351, filed Dec. 16, 2005; Douglas A. Voorhies; Culling Data Selection System and Method.

U.S. Appl. No. 11/397,528, filed Apr. 3, 2006; Douglas A. Voorhies; Tight Depth Range Occlusion Prediction System and Method.

Michael D. McCool, Chris Wales, Kevin Moule, "Incremental and Hierarchical Hilbert Order Edge Equation Polygon Rasterization," Aug. 2001, Proceedings of the ACM SIGGRAPH/EUROGRAPHICS Workshop on Graphics Hardware, pp. 65-72.

Final Office Action Mailed Jul. 7, 2011; U.S. Appl. No. 11/529,608.

M.J. Aftosmis, "Solution Adaptive Cartesian Grid Methods for Aerodynamic Flows With Complex Geometrics", Mar. 3, 1997, Lecture notes for 28th Computational Fluid Dynamics Lecture Series, von Kaman Institute for Fluid Dynamics, pp. 88-96.

Advisory Action/Entered Amendment After Final Dated Sep. 21, 2011; U.S. Appl. No. 11/539,608.

Non Final Office Action; Mail Date Nov. 21, 2011; U.S. Appl. No. 11/397,528.

* cited by examiner

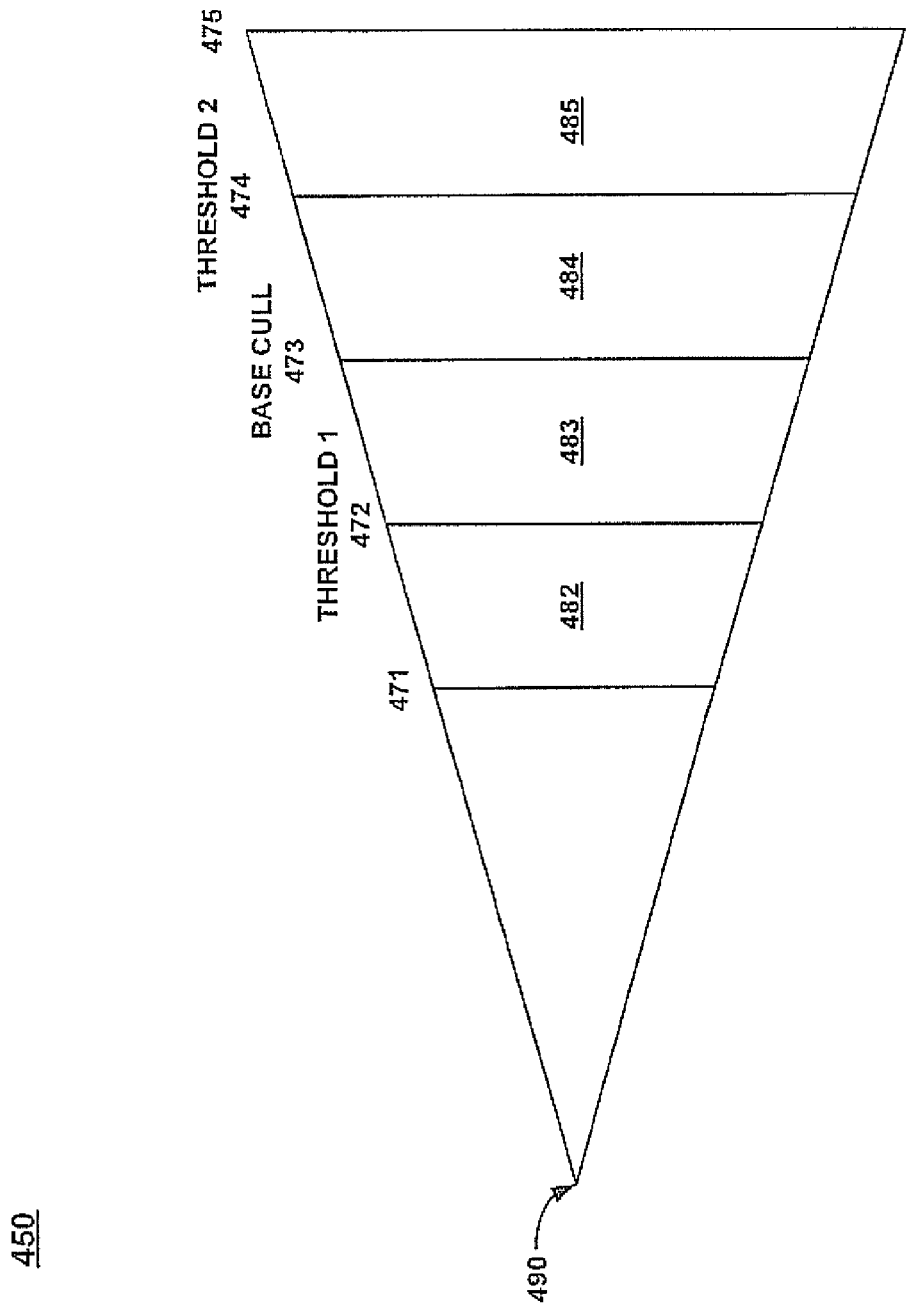

OCCLUSION PREDICTION COMPRESSION SYSTEM AND METHOD

FIELD OF THE INVENTION

The present invention relates to the field of graphics processing.

BACKGROUND OF THE INVENTION

Electronic systems and circuits have made a significant contribution towards the advancement of modern society and are utilized in a number of applications to achieve advantageous results. Numerous electronic technologies such as digital computers, calculators, audio devices, video equipment, and telephone systems facilitate increased productivity and cost reduction in analyzing and communicating data, ideas and trends in most areas of business, science, education and entertainment. Electronic systems designed to produce these results usually involve interfacing with a user and the interfacing often involves presenting graphical representation of images. Displaying graphics images usually requires intensive data processing which traditionally takes considerable time to process and often consumes significant power.

Computer graphics systems typically utilize a sequential stage or "pipeline" type process to map a three dimensional scene in the world coordinate system to a two dimensional projection (e.g., on a display screen). In most computer graphic systems an image is represented as a raster (an array) of logical picture elements (pixels). Pipelines typically assign parameter values to each pixel and the parameter values determine the nature of the projection on the display screen. The parameter values are digital values corresponding to certain attributes of the image (e.g. color, depth, etc.) measured over a small area of the image represented by a pixel. Typically each graphical image is represented by thousands of combined pixels. Providing information for each pixel is very data intensive and consumes a significant amount of processing resources.

There are a number of stages or processes included in a typical graphics pipeline. Various manipulations of pixel data are implemented at each stage in the pipeline. These manipulations often involve numerous computational processes that take a relatively long time to complete. In addition, the processing consumes significant power and can be a significant drain on limited power supplies, such as a battery. One process performed in a typical graphics pipeline is to eliminate pixel values that are occluded, such as values associated with "hidden" surfaces. The occlusion determining process typically occurs near or at the end of a graphics pipeline after a number of processing operations have been performed to establish a variety of pixel values. These processes are often performed even on pixel values that are eventually discarded at the end of the graphics pipeline.

The rate at which images are rendered in typical graphics systems is often critical to proper presentation of the information. Slow rendering rates often result in undesirable choppy or "jerky" presentations which usually results in a user experience that is non-immersive and unpleasant. The rate at which graphics systems can render images is often limited by the rate at which the processing devices can process the graphics information. However, user's tend to have ever increasing demands for ever more spectacular and clearer images with better resolutions. Achieving better resolution often involves more graphic information processing and advanced applications. As more information associated with sophisticated applications and complex image rending is fed into traditional graphics pipelines the time required to process all the information increases since the graphics processing capabilities of the graphics systems typically have an upper limit. In addition, accessing the increased amounts of information also increases the time involved in retrieving the information from various memories. The increases in time to perform processing and information accesses typically slows the rendering rate and adversely impacts the graphics presentation.

SUMMARY

An occlusion prediction compressing system and method are presented in accordance with embodiments of the present invention. In one embodiment, an occlusion prediction graphics processing method is utilized to predict which pixels are eventually occluded before intermediate processing stages are performed on the pixels. Culling information utilized to predict which pixel are occluded is compressed in accordance with embodiments of the present invention. In one embodiment, a cull value for a pixel culling area is retrieved and an end of pipe depth value associated with a prediction area within the pixel culling area is received. A determination is made if the end of pipe depth value is within a threshold range of the cull value. The cull value is updated based upon the relationship of the end of pipe depth value to offsets from the cull value. The cull value is associated with a mask which indicates if a plurality of prediction areas are fully occluded.

DESCRIPTION OF THE DRAWINGS

The accompanying drawings, which are incorporated in and form a part of this specification, illustrate embodiments of the invention by way of example and not by way of limitation. The drawings referred to in this specification should be understood as not being drawn to scale except if specifically noted.

FIG. 4B is a block diagram of one embodiment of a view volume divided into four regions or "buckets" by the offset values in accordance with one embodiment of the present invention.

DETAILED DESCRIPTION

Figure 1:
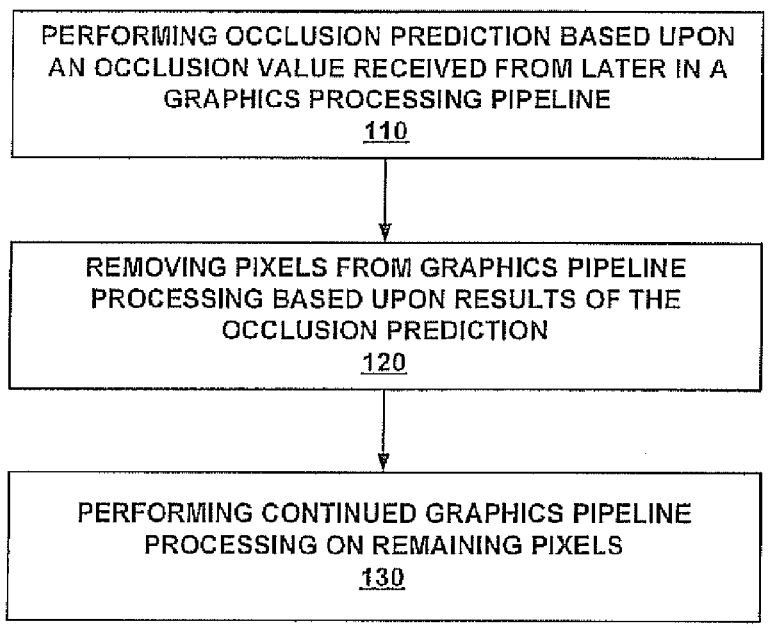
FIG. 1 is a flow chart of a graphics processing method in accordance with one embodiment of the present invention.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Some portions of the detailed descriptions which follow are presented in terms of procedures, logic blocks, processing, and other symbolic representations of operations on data bits within a computer memory. These descriptions and representations are the means generally used by those skilled in data processing arts to effectively convey the substance of their work to others skilled in the art. A procedure, logic block, process, etc., is here, and generally, conceived to be a self-consistent sequence of steps or instructions leading to a desired result. The steps include physical manipulations of physical quantities. Usually, though not necessarily, these quantities take the form of electrical, magnetic, optical, or quantum signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are associated with the appropriate physical quantities and are merely convenient labels applied to these quantities. Unless specifically stated otherwise as apparent from the following discussions, it is appreciated that throughout the present application, discussions utilizing terms such as "processing", "computing", "calculating", "determining", "displaying" or the like, refer to the action and processes of a computer system, or similar processing device (e.g., an electrical, optical, or quantum, computing device), that manipulates and transforms data represented as physical (e.g., electronic) quantities. The terms refer to actions and processes of the processing devices that manipulate or transform physical quantities within a computer system's component (e.g., registers, memories, other such information storage, transmission or display devices, etc.) into other data similarly represented as physical quantities within other components.

In one embodiment of the present invention a culling prediction is performed based upon a culling value received from a stage later in a graphics processing pipeline. The culling value is associated with a position in a viewing volume. The viewing volume is formed by a near plane closest to a user's perspective or "eye" (e.g., a closer Z value) and a farthest plane from a user's perspective or "eye" (e.g., a deeper Z value). References to near or nearer indicate a position within the view volume closer the user's perspective and far or farther indicate a position within the view volume a greater distance away from the user's perspective or "eye".

FIG. 1 is a flow chart of occlusion prediction graphics processing method 100 in accordance with one embodiment of the present invention. Occlusion prediction graphics processing method 100 facilitates efficient and effective utilization of processing resources. In one embodiment, occlusion prediction graphics processing method 100 is utilized to predict which pixel values are eventually occluded before intermediate processing stages are performed on the pixels. Pixel values are removed or discarded from the pipeline based upon culling prediction results and do not unnecessarily occupy processing resources. Remaining pixels are processed through the graphics processing pipeline.

In step 110, an occlusion prediction is performed based upon an occlusion value received from a stage later in a graphics processing pipeline. By receiving the occlusion value from a stage later in the graphics processing pipeline that already performs frame buffer accesses for its own purposes, additional memory access bandwidth is not consumed reading an occlusion value (e.g., from a frame buffer). In one embodiment of the present invention, the occlusion information is received from a stage (e.g., a raster operation stage) in the graphics processing pipeline that initiates final reads and writes of occlusion information (e.g., to a Z buffer, frame buffer, etc.). For example, an occlusion value is received from a graphics pipeline processing stage in which final depth (e.g., Z value) and stencil comparisons are performed. In one embodiment, the predicting is performed within a rasterizing stage based upon a culling value received from a raster operation (ROP) stage of a graphics processing pipeline.

In one embodiment of the present invention, the occlusion prediction is based upon an occlusion value associated with pixels within a prediction area. A quantity and configuration of pixels within bounds of a prediction area are established (e.g., 2 by 4 pixel prediction area, 4 by 4 pixel prediction area, etc.). If the occlusion value received from the end of the graphics processing pipeline indicates that the pixels in the prediction area currently being rasterized are behind the occlusion value, the prediction is the pixels currently being rasterized should be culled.

In one exemplary implementation, the prediction area is a square or rectangle. For occlusion testing, the portion of the prediction area that overlaps the primitive (e.g., a triangle) being drawn is considered. The overlap is convex and permits the nearest depth value within the overlap region to be ascertained. Since depth varies linearly across the primitive the nearest depth value will be found at a vertex (e.g., corner) of the overlap region. The vertex can be a corner of the square or rectangular prediction area, or at a vertex of the original primitive, or at an intersection of a prediction area side with a primitive side. The nearest vertex can be also determined using the primitive's depth plane equation. If the nearest or closest vertex has a depth value that is farther back or away from a user's eye, (e.g., has a deeper Z value) than an occlusion value (e.g., corresponding to the depth value bound on the already drawn pixels within the prediction area), a prediction is made that the primitive's depth values within the prediction area presently in raster stage are occluded by the corresponding pixel value in the depth buffer.

In step 120, pixel values are removed from the pipeline based upon the occlusion prediction results. In one exemplary implementation, the pixel values which the prediction indicates will be occluded are removed from the pipeline (e.g., discarded) before occupying intermediate graphics processing pipeline resources (e.g., shading system resources) and performing processing on the predicted occluded pixel values. Processing time is not consumed on pixel values that are not seen. Since pixel values that are occluded and not seen by the user are discarded at the end of the pipeline anyway, they are culled before intermediate processing is performed on them.

In step 130, continued graphics pipeline processing is performed on remaining pixel values. In one embodiment, shading processing is performed upon the remaining pixels. The remaining pixels are also subjected to full occlusion processing in a final occlusion analysis stage (e.g., Z buffer processing) and pixel values that were not culled earlier but are occluded are discarded during the final occlusion analysis stage.

In one embodiment of the present invention, stencil occlusion processing results are also predicted in step 110. For example, pixel values presently in the rasterizing stage of a graphics processing pipeline are examined for potential stencil processing and a prediction regarding the stencil processing is made. In one exemplary implementation, the stencil processing prediction includes a stencil value threshold comparison. If the pixel values presently in the rasterizer stage do not meet the stencil value threshold value, intermediate stencil processing is not performed on the pixel.

It is appreciated that the present invention can be implemented in a variety of embodiments. In one exemplary implementation, the present invention can be utilized in processing systems that support a variety of graphics applications including video games. For example, the present invention can be utilized in graphics rendering processes of a game console, personal computer, personal digital assistant, cell phone or any number of platforms for implementing a video game. It is also appreciated that references to video game application implementations are exemplary and the present invention is not limited to these implementations.

Figure 2:
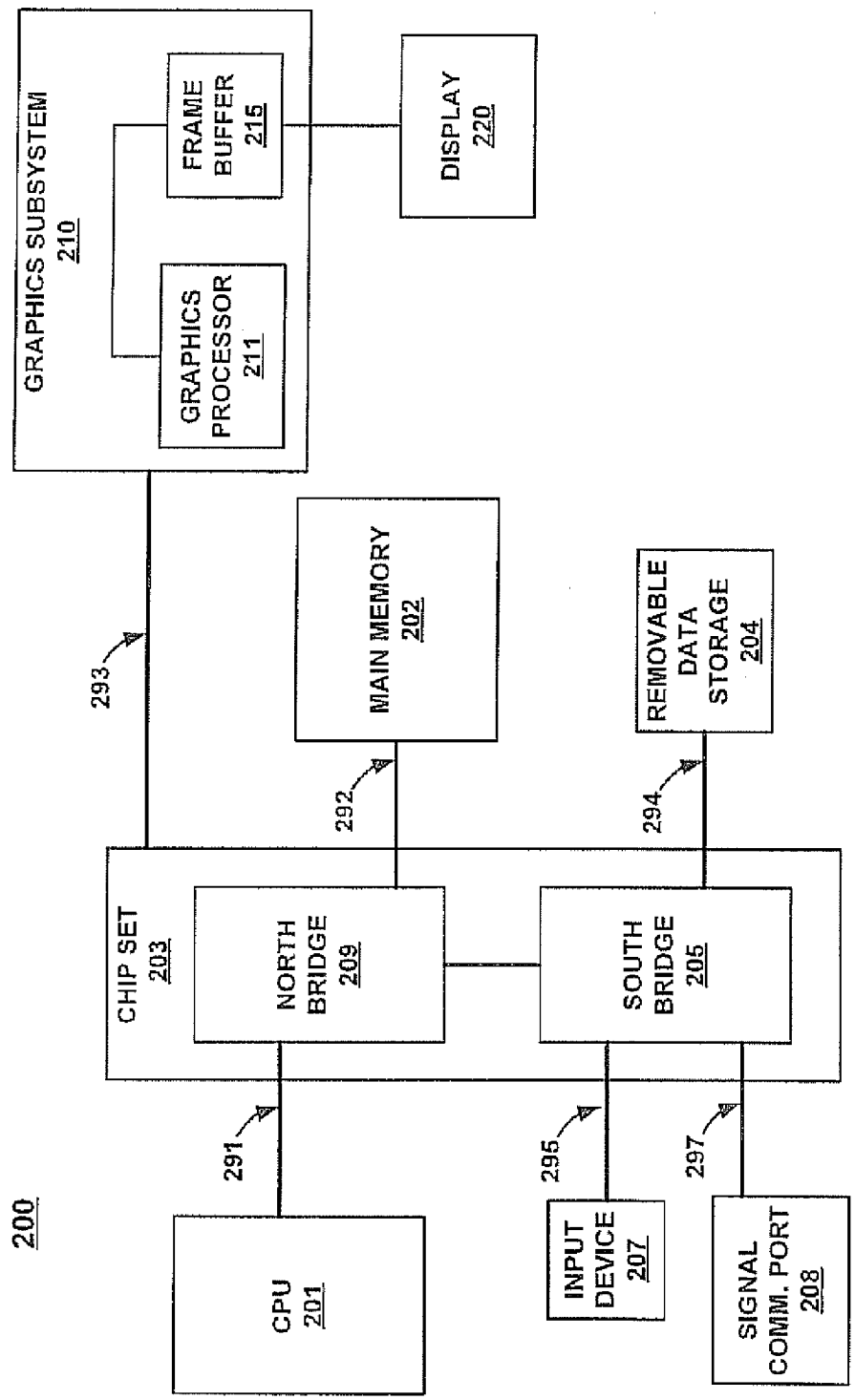
FIG. 2 is a block diagram of a computer system in accordance with one embodiment of the present invention.

FIG. 2 is a block diagram of a computer system 200, one embodiment of a computer system upon which embodiments of the present invention can be implemented. Computer system 200 includes central processor unit 201, main memory 202 (e.g., random access memory), chip set 203 with north bridge 209 and south bridge 205, removable data storage device 204, input device 207, signal communications port 208, and graphics subsystem 210 which is coupled to display 220. Computer system 200 includes several busses for communicatively coupling the components of computer system 200. Communication bus 291 (e.g., a front side bus) couples north bridge 209 of chipset 203 to central processor unit 201. Communication bus 292 (e.g., a main memory bus) couples north bridge 209 of chipset 203 to main memory 202.

Communication bus 293 (e.g., the Advanced Graphics Port interface) couples north bridge of chipset 203 to graphic subsystem 210. Communication buses 294-297 (e.g., a PCI bus) couple south bridge 205 of chip set 203 to removable data storage device 204, input device 207, and signal communications port 208 respectively. Graphics subsystem 210 includes graphics processor 211 and graphics buffer 215.

The components of computer system 200 cooperatively operate to provide presentations of graphics images. Communications bus 291 through 297 communicate information. Central processor 201 processes information. Main memory 202 stores information and instructions for the central processor 201. Removable data storage device 204 also stores information and instructions (e.g., functioning as a large information reservoir). Input device 206 provides a mechanism for inputting information and/or for pointing to or highlighting information on display 220. Signal communication port 208 provides a communication interface to exterior devices (e.g., an interface with a network). Display device 209 displays information in accordance with data stored in frame buffer 215. Graphics processor 211 processes graphics commands from central processor 201 and provides the resulting data to graphics buffer 215 for storage and retrieval by display monitor 220.

In one embodiment of the present invention, graphics processor 211 processes information, including graphics information (e.g., information associated with graphics processing method 100). Graphics processor 211 processes the graphics information in a pipeline sequence and performs culling during a rasterization stage of the pipeline. Graphics processor 211 can compare pre-cull values to end of graphics processing pipeline values (e.g., post occlusion determination values) to analyze if pre-cull pixel values should be culled. In one embodiment of the present invention, the cull values are associated with a prediction area. The end of graphics processing pipeline values can also be stored in an on chip register for utilization in future occlusion predictions.

Figure 3:
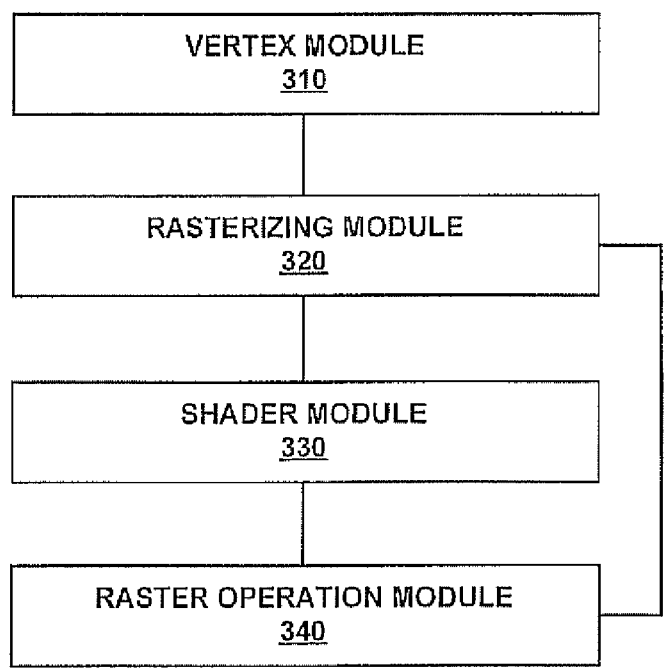
FIG. 3 is a block diagram of a graphics pipeline in accordance with one embodiment of the present invention.

FIG. 3 is a block diagram of graphics processing pipeline 300 in accordance with one embodiment of the present invention. Graphics processing pipeline 300 (e.g., a pixel processing pipeline) comprises pipeline vertex module 310, rasterizing module 320, shader module 330, and raster operation module 340. Vertex module 310, rasterizing module 320, shader module 330, and raster operation module 340 are serially communicatively coupled to one another. Raster operation module 340 is also communicatively coupled to rasterizing module 320. In one embodiment, graphics processing pipeline 300 is similar to a pipeline process utilized in computer system 200.

The components of graphics processing pipeline 300 cooperatively operate to perform graphics pipeline operations. Vertex module 310 determines vertices information and forwards the resulting information to rasterizing module 320. Rasterizing module 320 rasterizes pixels including performing culling based upon prediction results. In one exemplary implementation, rasterizing module 320 determines coordinate values (e.g., identifies X, Y and Z coordinate values) of the respectively received graphics pipeline pixel information and forwards graphics pipeline information to shader module 341. Shader module 330 performs pixel shading calculations on the pixel information and forwards the results to raster operation (ROP) component 340. Raster operation (ROP) component 340 performs final processing on pixel values (e.g., occlusion and stencil processing) and writes appropriate values to a frame buffer (not shown). For example, ROP component 340 reads "old" Z values from a Z buffer, compares the "old" Z values to corresponding current Z values and writes the corresponding current Z values to the Z buffer if the current Z values are nearer than the old Z values. ROP component 340 also forwards the farthest Z value in a prediction area to rasterizing module 320. In one embodiment, ROP component 340 also tests stencil values as they are read and/or written to determine if a pixel value update would be rejected. The results for a prediction area are aggregated similar to Z values by recording (e.g., asserting a corresponding bit in a stencil mask) if pixels within the prediction area would cause rejection.

In one exemplary implementation, rasterizing module 320 performs the rasterizing in a coarse rasterization stage and a fine rasterization stage. The occlusion culling can be performed after the coarse stage and before the fine stage and reduce precise pixel rasterization work of the fine stage performed on pixel values that are eventually discarded. This permits pixel values to be discarded at a rate faster than the fine rasterizer operates. Rasterizing module 320 establishes which pre-culled values are associated with pixels within bounds of a prediction area and which vertex of the prediction area is closest or nearest. Rasterizer module 320 compares the closest pre-culled vertex value to a corresponding occlusion value received from raster operation module 340 at the end of graphics processing pipeline 300. If the present closest pre-culled vertex value for the prediction area is behind the corresponding occlusion value for the prediction area received from the end of the graphics processing pipeline, the present group of pixel values associated with the predication area are culled (e.g., discarded) by rasterizer module 330 and not forwarded to the remaining modules for processing. In one embodiment, values received from ROP 340 are "outdated" and the Z values change monotonically closer to the eye. If the Z values change non-monotonically the culling operations are suspended until the start of the next frame.

Figure 4A:
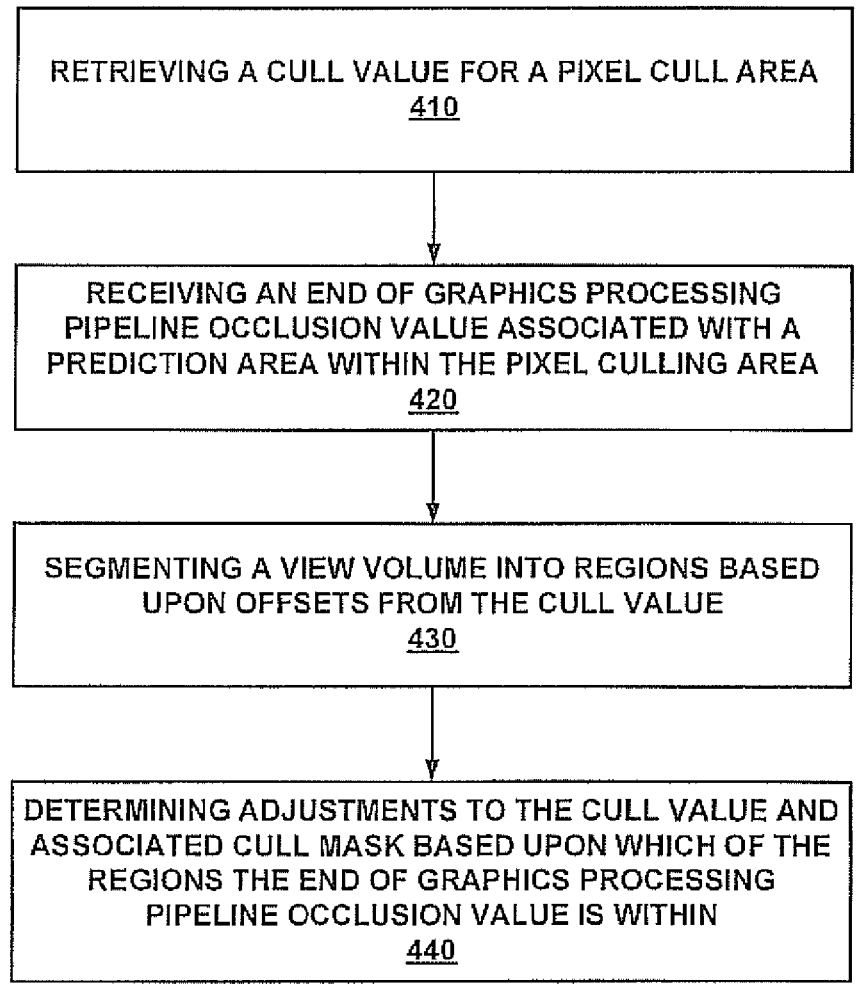
FIG. 4A is a flow chart of a pixel cull value compression method in accordance with one embodiment of the present invention.

In one embodiment of the present invention, occlusion prediction information is compressed. FIG. 4A is a flow chart of pixel cull value compression method 400 in accordance with one embodiment of the present invention. In one embodiment, the cull value and an associated mask are stored in an on chip memory (e.g., random access memory, cache, etc.). The mask denotes fully occluded pixels at the corresponding cull value or in front of the cull value. The mask is stored in a memory word with the cull value. In one embodiment of the present invention, pixel cull value compression method 400 is used to compress occlusion prediction values utilized in occlusion prediction graphics processing method 100.

In step 410, a cull value for a pixel culling area is retrieved. The cull value is associated with a pixel culling area (e.g., a 16 by 16 pixel area). In one embodiment, the cull value is retrieved from an on chip memory location (e.g., RAM, cache, etc.). In one exemplary implementation, an initial cull value is established based upon the farthest plane on a depth axis of a viewing volume. In another exemplary implementation, the initial cull value is the farthest depth threshold value of an occluding volume.

In step 420, an end of graphics processing pipeline occlusion value associated with a prediction area within the pixel culling area is received. In one embodiment, an end of graphics processing pipeline occlusion value is received from a raster operation (ROP) component at the end of a graphics processing pipeline. In one exemplary implementation, a plurality of prediction area end of graphics processing pipeline occlusion values are aggregated. The aggregation includes establishing the farthest occlusion value. A mask (e.g., a depth or Z value mask, a stencil mask, etc.) is also produced as part of the aggregation. The mask denotes which prediction areas within the culling area have end of graphics processing pipeline Z values at or nearer than the Z value associated with the mask.

In one embodiment of the present invention, the mask includes occlusion indications for each prediction area within a culling region. For example, a depth or Z value mask indicates which pixels values in a particular culling area are equal to or in front of a Z cull value associated with the mask. In one embodiment, each bit in a mask is associated with a bounded pixel area permitting significant compression. For example, storing a cull Z value and a mask in which each bit represents a 4 by 2 prediction area permits 139 to 1 compression in one exemplary implementation. In one exemplary implementation the cull Z value and mask are stored in a 44 bit word on chip memory word associated with a 16 by 16 pixel cull area or region. The 44 bit memory word comprises a 12 bit cull Z value and 32 bit mask in which each bit represents a 4 by 2 pixel prediction area. In a Z buffer the 16 by 16 cull area Z information is represented by 6,144 bits (16 pixels times 16 pixels times 24 bits).

In step 430, a view volume is segmented into regions based upon offsets from the cull value. In one embodiment, there is a negative offset range value that establishes a near threshold and a positive offset range value that establishes a far threshold value. FIG. 4B is a block diagram of one embodiment of a view volume 450 divided into four regions or "buckets" by the offset values. View volume 450 is defined by nearest view plane 471 and farthest view plane 475 as viewed from the perspective or eye of a user at point 490. Cull value 473 is a base or limit cull value. The near threshold value 472 is established by adding a negative offset value to cull value 473. Threshold 474 is established by adding a positive offset value to cull value to cull value 473.

In one embodiment of the present invention, software establishes the offset values. For example, the offset values can be established according to the application. In one embodiment of the present invention, the negative cull value and positive cull value are established by drivers.

In step 440, a determination of adjustments to the cull value and associated culling mask is made based upon which of the regions or "buckets" (e.g., 482, 483, 484, or 485) the end of graphics processing pipeline occlusion value is within. If the end of graphics processing pipeline value is nearer than near threshold 472 then the cull value is replaced by the end of graphics processing pipeline occlusion value and the culling mask bits are updated accordingly. For example, culling mask bits corresponding to the prediction area associated with the end of graphics processing pipeline occlusion value are asserted and the remaining culling mask bits are unasserted.

If the end of graphics processing pipeline value is between the near threshold 472 and the cull value 473 then the cull value is left unchanged and the culling mask bits are updated accordingly. For example, the culling mask bits corresponding to the prediction area associated with the end of graphics processing pipeline occlusion value are asserted and the remaining culling mask bits are unchanged. In one exemplary implementation, in which each bit in the mask corresponds to a prediction area, a logical OR operation can be performed on the prediction area bits in the mask and the prediction area bits associated with the end of graphics processing pipeline value to produce updated mask values.

If the end of graphics processing pipeline value is between the cull value 473 and the far threshold 474 then the cull value is replaced by the end of graphics processing pipeline occlusion value and the culling mask bits are updated accordingly. For example, the culling mask bits corresponding to the prediction area associated with the end of graphics processing pipeline occlusion value are asserted and the remaining culling mask bits are unchanged. Again, in one exemplary implementation in which each bit in the mask corresponds to a prediction area, a logical OR operation can be performed on the prediction area bits in the mask and the prediction area bits associated with the end of graphics processing pipeline value to produce updated mask values. If the end of graphics processing pipeline value is farther than threshold 474 no adjustments are made to the cull value or associated mask.

Figure 5:
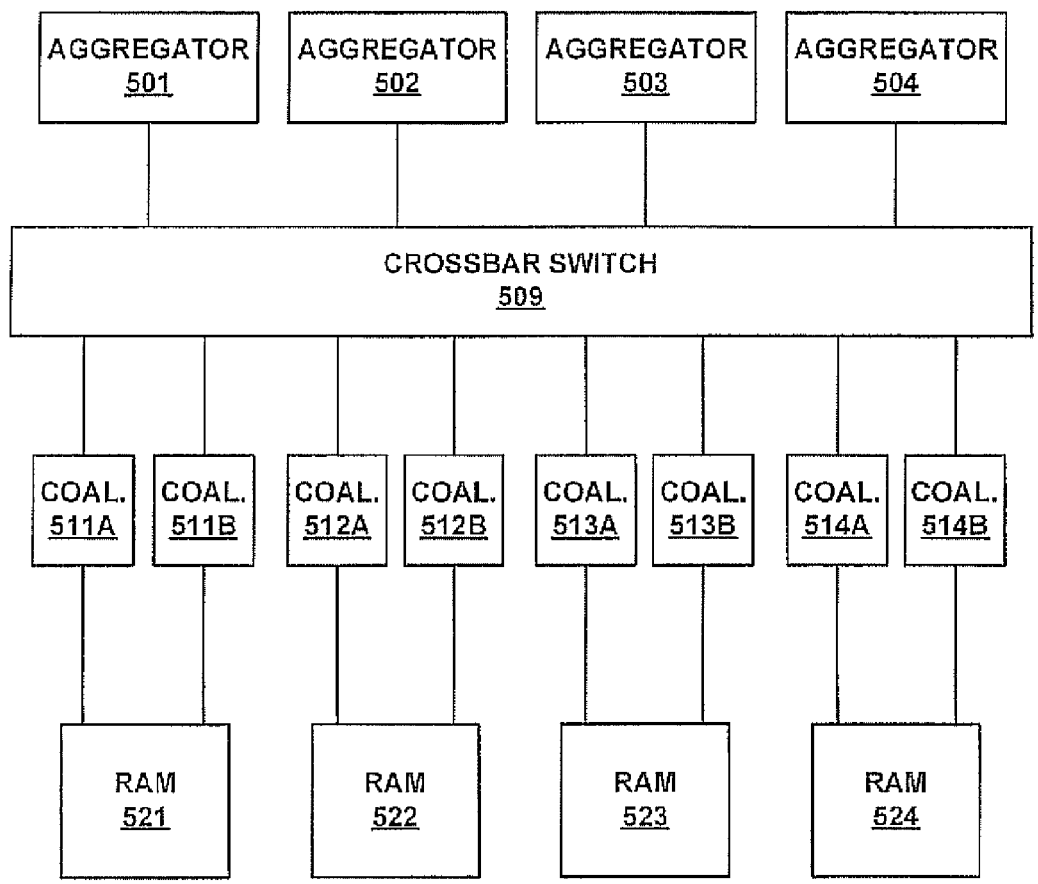
FIG. 5 is a block diagram of pixel cull value compression system 500 in accordance with one embodiment of the present invention.

FIG. 5 is a block diagram of pixel cull value compression system 500 in accordance with one embodiment of the present invention. Pixel cull value compression system 500 includes aggregators 501 through 504, crossbar switch 509, coalesce components 511A through 514B, and random access memories (RAMs) 521 through 524. Aggregators 501 through 504 are coupled to crossbar switch 509 which is coupled to coalesce components 511A through 514B. Coalesce components 511A and B are coupled to RAM 521. Coalesce components 512A and B are coupled to RAM 522. Coalesce components 513 A and B are coupled to RAM 523. Coalesce components 514A and B are coupled to RAM 524.

The components of pixel cull value compression system 500 cooperatively operate to compress pixel cull value information. Aggregators 501 through 504 aggregate end of pipe depth value information associated with a bounded pixel area. In one exemplary implementation, aggregators 501 through 504 aggregate end of graphics processing pipeline values received in step 420. Crossbar switch 509 interleaves information associated with a plurality of the bounded pixel areas in a tiled manner. Crossbar switch 509 also balances information associated with the plurality of bounded pixel areas across the plurality of memories 521 through 524. Coalesce components 511A through 514B coalesce depth value information for a plurality of the bounded pixel areas located in adjacent proximity in a presentation plane and replace the updated base cull depth information. In one exemplary implementation, coalesce buffers 511A through 514B segment a view volume into regions based upon offsets from the cull value (e.g., similar to step 430), and determine adjustments to the cull value and cull masks (e.g., similar to step 440).

In one embodiment, coalesce components 511A through 511B include an accumulation register that stores occluder packets as a determination is made as to stores the occlusion information from an end of graphics processing pipeline stage (e.g., raster operation module 340) in a compressed form. In one embodiment of the present invention, the coalesce components 511A through 511B perform segmentation into regions based upon offset from the cull value (e.g., perform step 430). As packets associated with other culling areas begin to arrive and accumulation registers are occupied the current accumulation of information gets displaced and written to on chip memory (e.g., a RAM, cache, etc.). Random access memories 521 through 524 comprise a plurality of memory sub-components and store updated base cull depth information.

Thus, the present invention facilitates optimized utilization of processing resources and conservation of time. Pixels that are eventually occluded are not processed in intermediate stages of a graphics pipeline. By efficiently and effectively utilizing processing resources, end result graphics images processing rate is increased and faster rendering is provided. The present invention also facilitates rate increases because pixels can be culled or rejected faster than they are processed. For example, pixels can be rejected at four times the fastest processing rate and in a frame where 25% of the pixels are culled the overall increase is 23%. In addition, the present invention does not consume additional bandwidth accessing a frame buffer to obtain actual Z or stencil values and updating a compressed representation. The present invention also provides an efficient comparison mechanism without comparing a primitive's (e.g., triangle) full Z range against an occluder Z. The present invention also facilitates conservation of power by not expending energy on intermediate processing for pixels that are eventually discarded before rendering.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A pixel cull value compression method comprising;
retrieving a cull value for a pixel culling area;
receiving an end of graphics processing pipeline occlusion value associated with a prediction area within said pixel culling area, including an end of graphics processing pipeline occlusion value associated with an occluded pixel;
segmenting a view volume into regions based upon offsets from the said cull value, wherein said cull value varies from a farthest view plane;
determining adjustments to said cull value and associated cull mask based upon which of said regions said end of graphics processing pipeline occlusion value is within;
removing pixel values from a graphics pipeline in an electronic system based upon results of an occlusion prediction;
suspending said removing until a next frame if a depth value associated with said occlusion value change non-monotonically; and
performing continued graphics pipeline processing on remaining pixel wherein remaining pixel values are associated with display illumination.

2. A pixel cull value compression method of claim 1 wherein said cull value is updated in accordance with said adjustments and stored in a random access memory.

3. A pixel cull value compression method of claim 1 wherein said cull value is updated in accordance with said adjustments and stored in an on chip memory.

4. A pixel cull value compression method of claim 1 further comprising aggregating a plurality of prediction area end of graphics processing pipeline occlusion values.

5. A pixel cull value compression method of claim 4 wherein said end of graphics processing pipeline value is received from a raster operation stage.

6. A pixel cull value compression method of claim 5 wherein said aggregating includes outputting a mask comprising a plurality of bits, wherein each bit in said mask represents a prediction area and indicates if pixel values associated with a corresponding prediction area are at or in front of said cull value.

7. A pixel cull value compression method further claim 6 wherein said mask is stored in a memory word with said value.

8. A pixel cull value compression method of claim 1 further comprising coalescing depth value information for a plurality of bounded pixel areas located in adjacent proximity in a presentation plane.

9. A pixel cull value compression system comprising:
a processor communicatively coupled to said bus, said processor for processing information, including:
receiving an end of graphics processing pipeline occlusion value associated with a prediction area within a pixel culling area, including an end of graphics processing pipeline occlusion value associated with an occluded pixel;
removing pixel values from a graphics pipeline of said processor based upon results of an occlusion prediction; wherein said removing is suspended until a next frame if a depth value associated with said occlusion value change non-monotonically;
an aggregator for aggregating end of pipe depth value information associated with a bounded pixel area;
a crossbar switch coupled to said aggregator, said crossbar switch for interleaving information received from said aggregator and associated with a plurality of said bounded pixel areas in a tiled manner;
a coalesce component in an electronic system coupled to said crossbar switch, said coalesce component for receiving information, including depth value information, from said crossbar switch, and coalescing said depth value information in a compressed form for a plurality of said bounded pixel areas located in adjacent proximity in a presentation plane; and
a memory coupled to said coalesce component, said memory for storing updated base cull depth information received from said coalesce component, wherein remaining pixel values are associated with display illumination.

10. A pixel cull value compression system of claim 9 wherein said memory is an on chip memory.

11. A pixel cull value compression system of claim 9 wherein said memory is random access memory.

12. A pixel cull value compression system of claim 10 wherein said memory comprises a plurality of memory sub-components.

13. A pixel cull value compression system of claim 12 wherein said plurality of memory sub-components are random access memories.

14. A pixel cull value compression system of claim 10 said crossbar switch steers information associated with said plurality of bounded pixel areas across said plurality memory sub-components.

15. A graphics processing system comprising:
a bus for communicating graphics information;
a main memory communicatively coupled to said bus, said memory for storing said graphics information;
a processor communicatively coupled to said bus, said processor for processing information, including performing pixel occlusion predictions based upon an end of graphics processing pipeline occlusion value and a pixel cull value compression process, and removing pixel in accordance with said pixel occlusion predictions wherein said removing is suspended until a next frame if a depth value associated with changes non-monotonically; wherein remaining pixel values are associated with display illumination.

16. A graphics processing system of claim 15 wherein said pixel cull value compression process comprises:
retrieving a cull value for a pixel culling area;
receiving said end of graphics processing pipeline occlusion value associated with a prediction area within said pixel culling area;
segmenting a view volume into regions based upon offsets from the said cull value; and
determining adjustments to said cull value and associated cull mask based upon which of said regions said end of graphics processing pipeline occlusion value is within.

17. A graphics processing system of claim 16 where in said cull value is updated in accordance with said adjustments and stored in a random access memory.

18. A graphics processing system of claim 16 where said cull value is updated in accordance with said adjustments and stored in an on chip memory.

19. A graphics processing system of claim 15 further comprising aggregating a plurality of prediction area end of pipe depth values and establishing the farthest depth value.

20. A graphics processing system of claim 19 wherein said aggregating includes outputting a mask comprising a plurality of bits, wherein each bit in said mask represents a prediction area and indicates if pixel values associated with a corresponding prediction area are at or in front of said cull value.

* * * * *